(12) United States Patent
Jiang et al.

(10) Patent No.: US 9,900,780 B2
(45) Date of Patent: Feb. 20, 2018

(54) INTERFERENCE PROCESSING METHOD AND DEVICE

(71) Applicant: Huawei Technologies Co., Ltd., Shenzhen (CN)

(72) Inventors: Yanping Jiang, Shenzhen (CN); Xun Yang, Shenzhen (CN); Mu Zhao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 183 days.

(21) Appl. No.: 14/939,812

(22) Filed: Nov. 12, 2015

(65) Prior Publication Data

US 2016/0066196 A1 Mar. 3, 2016

Related U.S. Application Data

(63) Continuation of application No. PCT/CN2013/087420, filed on Nov. 19, 2013.

(30) Foreign Application Priority Data

May 27, 2013 (CN) .......................... 2013 1 0201874

(51) Int. Cl.
*H04W 4/00* (2009.01)
*H04W 16/14* (2009.01)
(Continued)

(52) U.S. Cl.
CPC ....... *H04W 16/14* (2013.01); *H04W 72/0426* (2013.01); *H04W 74/0816* (2013.01); *H04W 74/0825* (2013.01)

(58) Field of Classification Search
None
See application file for complete search history.

(56) References Cited

U.S. PATENT DOCUMENTS

| | | | |
|---|---|---|---|
| 9,131,391 B2 * | 9/2015 | Madan | H04W 24/10 |
| 2004/0229621 A1 * | 11/2004 | Misra | H04W 16/08 |
| | | | 455/445 |

(Continued)

FOREIGN PATENT DOCUMENTS

| | | |
|---|---|---|
| CN | 101167387 B | 1/2011 |
| CN | 102469470 A | 5/2012 |

(Continued)

OTHER PUBLICATIONS

"IEEE Standard for Information technology—Telecommunications and information exchange between systems; Local and metropolitan area networks—Specific requirements; Part 11: Wireless LAN Medium Access Control (MAC) and Physical Layer (PHY) Specifications," IEEE Std 802.11-2012, pp. i-2695, Institute of Electrical and Electronics Engineers, New York, New York (Mar. 29, 2012).

(Continued)

*Primary Examiner* — Michael J Moore, Jr.
(74) *Attorney, Agent, or Firm* — Leydig, Voit & Mayer, Ltd.

(57) ABSTRACT

Embodiments of the present application provide an interference processing method and device. The method includes: a first access point (AP) receiving a frame sent by a second AP, the frame carrying downlink data load of the second AP, and intra-frequency interference existing between the first AP and the second AP; and the first AP adjusting, according to downlink data load of the first AP and the downlink data load of the second AP, a channel bandwidth used for performing data communication with a station (STA), so as to reduce the probability that the first AP and the second AP transmits data by using same channel. By using the method and the device for dynamically adjusting a bandwidth, intra-frequency interference of devices in OBSS can be reduced.

24 Claims, 4 Drawing Sheets

(51) Int. Cl.
*H04W 72/04* (2009.01)
*H04W 74/08* (2009.01)

(56) References Cited

U.S. PATENT DOCUMENTS

| | | | |
|---|---|---|---|
| 2005/0208949 A1* | 9/2005 | Chiueh | H04L 45/125 455/452.2 |
| 2008/0117833 A1* | 5/2008 | Borran | H04W 72/082 370/252 |
| 2009/0034457 A1 | 2/2009 | Bahl et al. | |
| 2011/0116489 A1 | 5/2011 | Grandhi | |
| 2013/0051256 A1 | 2/2013 | Ong et al. | |
| 2013/0121205 A1* | 5/2013 | Backes | H04W 36/22 370/254 |
| 2013/0272288 A1 | 10/2013 | Li et al. | |
| 2014/0293777 A1* | 10/2014 | Dhillon | H04W 28/0231 370/230 |
| 2015/0208426 A1* | 7/2015 | Jetcheva | H04W 72/0486 370/254 |

FOREIGN PATENT DOCUMENTS

| | | |
|---|---|---|
| CN | 102598745 A | 7/2012 |
| CN | 102694633 A | 9/2012 |

OTHER PUBLICATIONS

"IEEE Standard for Information technology—Telecommunications and information exchange between systems; Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz," IEEE Std 802.11ac-2013, pp. i-395, Institute of Electrical and Electronics Engineers, New York, New York (Dec. 11, 2013).

\* cited by examiner

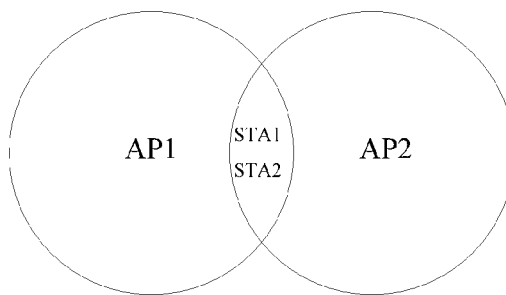
Fig. 1
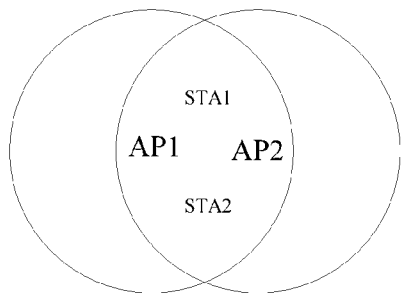
Fig. 2
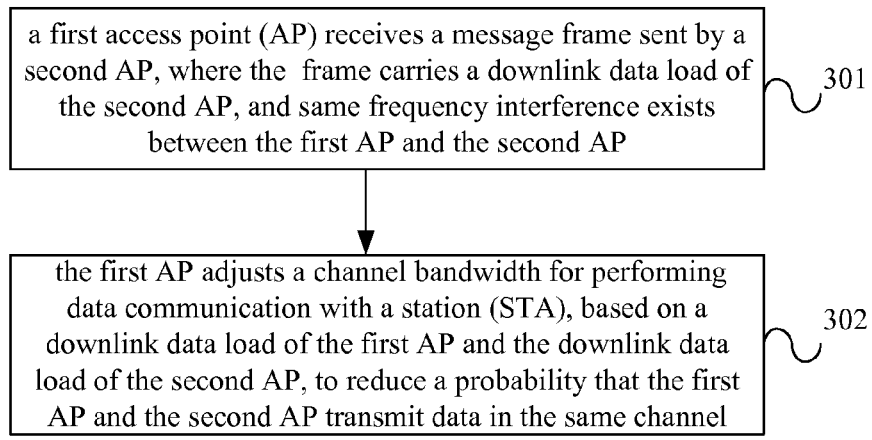
Fig. 3
| element identification | length | load |
| --- | --- | --- |
Fig. 4 the second AP sends a frame to the first AP, where the frame carries the downlink data load of the second AP, and thus the first AP adjusts a channel bandwidth for performing the data communication with the station (STA), based on a downlink data load of the first AP and the downlink data load of the second AP, where the same frequency interference exists between the first AP and the second AP ~501

Fig. 5 the first station (STA) receives a first frame sent by a first access point (AP), where the first frame carries a data load of the first AP ~601 the first STA receives a second frame sent by a second AP, where the second frame carries a data load of the second AP ~602 the first STA adjusts a channel bandwidth for performing data communication with the first AP, based on the data load of the first AP and the data load of the second AP, to reduce a probability that the first STA and the second STA transmit data in a same channel ~603

Fig. 6

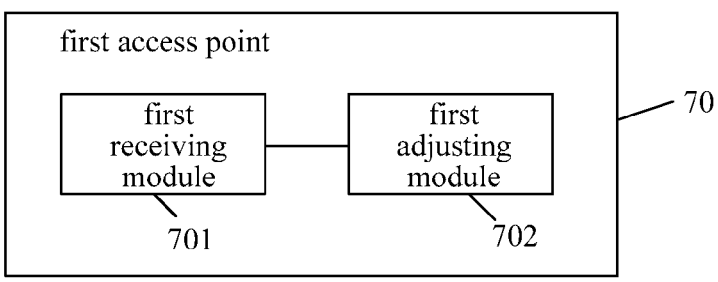

Fig. 7

INTERFERENCE PROCESSING METHOD AND DEVICE

CROSS-REFERENCE TO RELATED APPLICATIONS

This application is a continuation of International Patent Application No. PCT/CN2013/087420, filed on Nov. 19, 2013, which claims priority to Chinese Patent Application No. 201310201874.9, filed on May 27, 2013, both of which are hereby incorporated by reference in their entireties.

TECHNICAL FIELD

The present application relates to the technical field of wireless communication, and in particular to an interference processing method and a device.

BACKGROUND

In standard 802.11 for wireless local area network, an access point (AP) and multiple stations (STA) associated with the AP constitute a basic service set (BSS).

In practical application, multiple BSS operating on the same channel commonly have overlapping coverage areas, thereby forming an overlapping BSS (OBSS). In the OBSS, multiple APs send data on the same channel, or multiple STAs send data on the same channel, which may result in damage of a data frame. In the prior art, in order to reduce frequency interference generated when the APs or STAs send data on the same channel in the OBSS, a method for adjusting a bandwidth dynamically is provided in the 802.11 standard to eliminate the interference. The AP sends a request to send (RTS) frame on multiple sub-channels, the STA feeds back a clear To send (CTS) frame on a sub-channel with small interference, a maximum bandwidth available for communication is labeled in the CTS frame, and thus the AP adjusts a channel bandwidth for data communication with the STA based on the CTS frame.

With the existing method for adjusting the bandwidth dynamically, in a case that the APs send data, each of multiple STAs in an OBSS interference area may feed back the CTS frame to the AP associated therewith on the same sub-channel with small interference, since the multiple STAs suffer similar level of interference. Thus, the APs may obtain the same channel after performing the dynamic bandwidth adjustment based on the CTS frame; and great same-frequency interference may be generated when the APs send data to the STA associated therewith on the same channel.

SUMMARY

An interference processing method and device are provided according to embodiments of the present application, to reduce interference between devices in an OBSS.

In a first aspect, an interference processing method is provided according to the present application, which includes:

receiving, by a first access point (AP), a frame from a second AP, where the frame carries a downlink data load of the second AP, and frequency interference exists between the first AP and the second AP; and adjusting, by the first AP, a channel bandwidth for performing data communication with a station (STA), based on a downlink data load of the first AP and the downlink data load of the second AP, to reduce a probability that the first AP and the second AP transmit data in the same channel.

In conjunction with the first aspect, in a first possible implementing way of the first aspect, the adjusting, by the first AP, a channel bandwidth for performing data communication with a station (STA), based on a downlink data load of the first AP and the downlink data load of the second AP may include:

obtaining, by the first AP, a load sum of the downlink data load of the first AP and the downlink data load of the second AP; and determining, by the first AP, relationship of values between the load sum and a first preset load and relationship of values between the load sum and a second preset load; and adjusting, by the first AP, the channel bandwidth for performing the data communication with the STA based on the relationships of values, where the first preset load is less than the second preset load.

In conjunction with the first possible implementing way of the first aspect, in a second possible implementing way of the first aspect, the determining, by the first AP, relationships of values between the load sum and a first preset load and between the load sum and a second preset load; and adjusting, by the first AP, the channel bandwidth for performing the data communication with the STA based on the relationships of the values may include:

determining that the channel bandwidth for performing the data communication with the STA is a maximum channel bandwidth; contending for the channel according to a carrier sense multiple access with collision avoidance (CSMA/CA) mechanism; and adjusting the channel bandwidth for performing the data communication with the STA to the maximum channel bandwidth, in a case that the first AP determines that the load sum is less than or equal to the first preset load;

determining that the channel bandwidth for performing the data communication with the STA is the maximum channel bandwidth; determining an access probability for accessing the maximum channel bandwidth based on a load proportion between the downlink data load of the first AP and the downlink data load of the second AP; determining that an access value generated randomly by the first AP is less than the access probability; and adjusting the channel bandwidth for performing the data communication with the STA to the maximum channel bandwidth, in a case that the first AP determines that the load sum is greater than the first preset load and is less than or equal to the second preset load; or adjusting the channel bandwidth for performing the data communication with the STA to a bandwidth of a preset sub-channel; or determining the channel bandwidth for performing the data communication with the STA based on a relationship of load value between the downlink data load of the first AP and the downlink data load of the second AP; and adjusting the channel bandwidth for performing the data communication with the STA, to a channel bandwidth determined by the first AP based on the relationship of the load value, in a case that the first AP determines that the load sum is greater than the second preset load.

In conjunction with the second possible implementing way of the first aspect, in a third possible implementing way of the first aspect, the determining, by the first AP, the channel bandwidth for performing the data communication with the STA, based on a relationship of load value between the downlink data load of the first AP and the downlink data load of the second AP may include:

determining that the channel bandwidth for performing the data communication with the STA is less than the maximum channel bandwidth, in a case that the first AP determines that the downlink data load of the first AP is less than the downlink data load of the second AP; or determining that the channel bandwidth for performing the data communication with the STA is the maximum channel bandwidth, in a case that the first AP determines that the downlink data load of the first AP is greater than the downlink data load of the second AP.

In conjunction with the second possible implementing way of the first aspect, in a fourth possible implementing way of the first aspect, before the adjusting, by the first AP, the channel bandwidth for performing the data communication with the STA to a bandwidth of a preset sub-channel, the method may further include:

selecting, by the first AP, the preset sub-channel from the channel randomly; or determining, by the first AP, a sub-channel selected by the second AP; and selecting a sub-channel other than the sub-channel in the channel, as the preset sub-channel.

In conjunction with the fourth possible implementing way of the first aspect, in a fifth possible implementing way of the first aspect, the determining, by the first AP, a sub-channel of the second AP may include:

receiving, by the first AP, a sub-channel notification frame from the second AP, where the sub-channel notification frame carries the sub-channel selected by the second AP;

sending, by the first AP, a sub-channel request frame to the second AP; and receiving, by the first AP, a sub-channel response frame from the second AP, where the sub-channel response frame carries the sub-channel selected by the second AP; or sending, by the first AP, a measurement request frame to the STA; and receiving, by the first AP, a measurement response frame from the STA, where the measurement response frame carries the sub-channel selected by the second AP.

In conjunction with the first aspect and the first possible implementing way to the fifth possible implementing way of the first aspect, in a sixth possible implementing way of the first aspect, the method may further include:

determining, by the first AP, that the frequency interference exists between the first AP and the second AP, based on a signal strength of any one or a combination of a management frame, a control frame and a data frame, where the management frame, the control frame and the data frame are sent by at least one of the second AP and an STA associated with the second AP.

In a second aspect, an interference processing method is provided according to the present application, which includes:

receiving, by a first station (STA), a first frame from a first access point (AP), where the first frame carries a data load of the first AP;

receiving, by the first STA, a second frame from a second AP, where the second frame carries a data load of the second AP; and adjusting, by the first STA, a channel bandwidth for performing data communication with the first AP, based on the data load of the first AP and the data load of the second AP, to reduce a probability that the first STA and the second STA transmit data in the same channel, where frequency interference exists between the first STA and the second STA.

In conjunction with the second aspect, in a first possible implementing way of the second aspect, the adjusting, by the first STA, a channel bandwidth for performing the data communication with the first AP, based on the data load of the first AP and the data load of the second AP may include:

obtaining, by the first STA, a load sum of the data load of the first AP and the data load of the second AP; and determining, by the first STA, relationships of values between the load sum and a first preset load and between the load sum and a second preset load; and adjusting, by the first STA, the channel bandwidth for performing the data communication with the first AP based on the relationships of the values, where the first preset load is less than the second preset load.

In conjunction with the first possible implementing way of the second aspect, in a second possible implementing way of the second aspect, the determining, by the first STA, relationships of values between the load sum and a first preset load and between the load sum and a second preset load; and adjusting, by the first STA, the channel bandwidth for performing the data communication with the first AP based on the relationships of the values may include:

determining that the channel bandwidth for performing the data communication with the first AP is a maximum channel bandwidth; and contending for the channel according to a carrier sense multiple access with collision avoidance (CSMA/CA) mechanism; and adjusting the channel bandwidth for performing the data communication with the first AP to the maximum channel bandwidth, in a case that the first STA determines that the load sum is less than or equal to the first preset load;

determining that the channel bandwidth for performing the data communication with the first AP is the maximum channel bandwidth; determining an access probability for accessing the maximum channel bandwidth, based on a load proportion between the data load of the first AP and the data load of the second AP; determining that an access value generated randomly by the first STA is less than the access probability; and adjusting the channel bandwidth for performing the data communication with the first AP to the maximum channel bandwidth, in a case that the first STA determines that the load sum is greater than the first preset load and is less than or equal to the second preset load; or adjusting the channel bandwidth for performing the data communication with the first AP to a bandwidth of a preset sub-channel; or determining the channel bandwidth for performing the data communication with the first AP based on a relationship of load value between the data load of the first AP and the data load of the second AP; and adjusting the channel bandwidth for performing the data communication with the first AP, to a channel bandwidth determined by the first STA based on the relationship of the load value, in a case that the first STA determines that the load sum is greater than the second preset load.

In conjunction with the second possible implementing way of the second aspect, in a third possible implementing way of the second aspect, the determining, by the first STA, the channel bandwidth for performing the data communication with the first AP, based on a relationship of load value between the data load of the first AP and the data load of the second AP may include:

determining that the channel bandwidth for performing the data communication with the first AP is less than the maximum channel bandwidth, in a case that the first STA determines that the data load of the first AP is less than the data load of the second AP; or determining that the channel bandwidth for performing the data communication with the first AP is the maximum channel bandwidth, in a case that the first STA determines that the data load of the first AP is greater than the data load of the second AP.

In conjunction with the second possible implementing way of the second aspect, in a fourth possible implementing way of the second aspect, before the adjusting, by the first STA, the channel bandwidth for performing the data communication with the first AP to a bandwidth of a preset sub-channel, the method may further include:

receiving, by the first STA, a sub-channel notification frame from the first AP, where the sub-channel notification frame carries a preset sub-channel selected by the first AP.

In conjunction with the second aspect and the first possible implementing way to the fourth possible implementing way of the second aspect, in a fifth possible implementing way of the second aspect, the data load may be a downlink data load, or a load sum of an uplink data load and a downlink data load.

In conjunction with the second aspect and the first possible implementing way to fifth possible implementing way of the second aspect, in a sixth possible implementing way of the second aspect, the method may further include:

determining, by the first STA, that the frequency interference exists between the first STA and the second STA, based on a signal strength of any one or a combination of a management frame, a control frame and a data frame, where the management frame, the control frame and the data frame are sent by the second AP.

In a third aspect, a first access point (AP) is provided according to the present application, which includes:

a first receiving module, configured to receive a frame sent by a second AP, where the frame carries a downlink data load of the second AP, and frequency interference exists between the first AP and the second AP; and a first adjusting module, configured to adjust a channel bandwidth for performing data communication with a station (STA), based on a downlink data load of the first AP and the downlink data load of the second AP, to reduce a probability that the first AP and the second AP transmit data in the same channel.

In conjunction with the third aspect, in a first possible implementing way of the third aspect, the first adjusting module may include:

a downlink data load obtaining unit, configured to obtain a load sum of the downlink data load of the first AP and the downlink data load of the second AP; and a first bandwidth determining unit, configured to determine a relationship of values between the load sum and a first preset load and a relationship of values between the load sum and a second preset load, and adjust the channel bandwidth for performing the data communication with the STA based on the relationship of values, where the first preset load is less than the second preset load.

In conjunction with the first possible implementing way of the third aspect, in a second possible implementing way of the third aspect, the first bandwidth determining unit may be configured to:

determine that the channel bandwidth for performing the data communication with the STA is a maximum channel bandwidth; contend for a channel according to a carrier sense multiple access with collision avoidance (CSMA/CA) mechanism; and adjust the channel bandwidth for performing the data communication with the STA to the maximum channel bandwidth, in a case that it is determined that the load sum is less than or equal to the first preset load;

determine that the channel bandwidth for performing the data communication with the STA is the maximum channel bandwidth; determine an access probability for accessing the maximum channel bandwidth based on a load proportion between the downlink data load of the first AP and the downlink data load of the second AP; and determine that an access value generated randomly by the first AP is less than the access probability; and adjust the channel bandwidth for performing the data communication with the STA to the maximum channel bandwidth, in a case that it is determined that the load sum is greater than the first preset load and is less than or equal to the second preset load; or adjust the channel bandwidth for performing the data communication with the STA to a bandwidth of a preset sub-channel; or determine the channel bandwidth for performing the data communication with the STA based on a relationship of load value between the downlink data load of the first AP and the downlink data load of the second AP; and adjust the channel bandwidth for performing the data communication with the STA, to a channel bandwidth determined by the first AP based on a load comparison, in a case that it is determined that the load sum is greater than the second preset load.

In conjunction with the second possible implementing way of the third aspect, in a third possible implementing way of the third aspect, the first bandwidth determining unit may be further configured to:

determine that the channel bandwidth for performing the data communication with the STA is less than the maximum channel bandwidth, in a case that it is determined that the downlink data load of the first AP is less than the downlink data load of the second AP; or determine that the channel bandwidth for performing the data communication with the STA is the maximum channel bandwidth, in a case that it is determined that the downlink data load of the first AP is greater than the downlink data load of the second AP.

In conjunction with the second possible implementing way of the third aspect, in a fourth possible implementing way of the third aspect, the first bandwidth determining unit may be further configured to: before the channel bandwidth for performing the data communication with the STA is adjusted to a bandwidth of a preset sub-channel, select the preset sub-channel from the channel randomly; or determine a sub-channel selected by the second AP; and select a sub-channel other than the sub-channel in the channel, as the preset sub-channel.

In conjunction with the fourth possible implementing way of the third aspect, in a fifth possible implementing way of the third aspect, the first bandwidth determining unit may be further configured to:

receive a sub-channel notification frame from the second AP, where the sub-channel notification frame carries the sub-channel selected by the second AP;

send a sub-channel request frame to the second AP, and receive a sub-channel response frame from the second AP, where the sub-channel response frame carries the sub-channel selected by the second AP; or send a measurement request frame to the STA, and receive a measurement response frame from the STA, where the measurement response frame carries the sub-channel selected by the second AP.

In conjunction with the third aspect and the first possible implementing way to the fifth possible implementing way of the third aspect, in a sixth possible implementing way of the third aspect, the first AP may further include:

a first interference determining module, configured to determine that the frequency interference exists between the first AP and the second AP, based on a signal strength of any one or a combination of a management frame, a control frame and a data frame, where the management frame, the control frame and the data frame are sent by at least one of the second AP and an STA associated with the second AP.

In a fourth aspect, a first station (STA) is provided according to the present application, which includes:

a second receiving module, configured to receive a first frame from a first access point (AP), where the first frame carries a data load of the first AP;

a third receiving module, configured to receive a second frame from a second AP, where the second frame carries a data load of the second AP; and a second adjusting module, configured to adjust a channel bandwidth for performing data communication with the first AP, based on the data load of the first AP and the data load of the second AP, to reduce a probability that the first STA and a second STA transmit data in the same channel, where frequency interference exists between the first STA and the second STA.

In conjunction with the fourth aspect, in a first possible implementing way of the fourth aspect, the second adjusting module may include:

a data load obtaining unit, configured to obtain a load sum of the data load of the first AP and the data load of the second AP; and a second bandwidth determining unit, configured to determine a relationship of values between the load sum and a first preset load and a relationship of values between the load sum and a second preset load; and adjust the channel bandwidth for performing the data communication with the first AP based on the relationships of the values, where the first preset load is less than the second preset load.

In conjunction with the first possible implementing way of the fourth aspect, in a second possible implementing way of the fourth aspect, the second bandwidth determining unit may be configured to:

determine that the channel bandwidth for performing the data communication with the first AP is a maximum channel bandwidth; contend for a channel according to a carrier sense multiple access with collision avoidance (CSMA/CA) mechanism; and adjust the channel bandwidth for performing the data communication with the first AP to the maximum channel bandwidth, in a case that it is determined that the load sum is less than or equal to the first preset load;

determine that the channel bandwidth for performing the data communication with the first AP is the maximum channel bandwidth; determine an access probability for accessing the maximum channel bandwidth, based on a load proportion between the data load of the first AP and the data load of the second AP; determine that an access value generated randomly by the first STA is less than the access probability; and adjust the channel bandwidth for performing the data communication with the first AP to the maximum channel bandwidth, in a case that it is determined that the load sum is greater than the first preset load and is less than or equal to the second preset load;

adjust the channel bandwidth for performing the data communication with the first AP to a bandwidth of a preset sub-channel; or determine the channel bandwidth for performing the data communication with the first AP based on a relationship of load value between the data load of the first AP and the data load of the second AP; and adjust the channel bandwidth for performing the data communication with the first AP to a channel bandwidth determined by the first STA based on the relationship of the load value, in a case that it is determined that the load sum is greater than the second preset load.

In conjunction with the second possible implementing way of the fourth aspect, in a third possible implementing way of the fourth aspect, the second bandwidth determining unit may be further configured to:

determine that the channel bandwidth for performing the data communication with the first AP is less than the maximum channel bandwidth, in a case that it is determined that the data load of the first AP is less than the data load of the second AP; or determine that the channel bandwidth for performing the data communication with the first AP is the maximum channel bandwidth, in a case that it is determined that the data load of the first AP is greater than the data load of the second AP.

In conjunction with the second possible implementing way of the fourth aspect, in a fourth possible implementing way of the fourth aspect, the second bandwidth determining unit may be further configured to: before the channel bandwidth for performing the data communication with the first AP is adjusted to the bandwidth of the preset sub-channel, receive a sub-channel notification frame from the first AP, where the sub-channel notification frame carries a preset sub-channel selected by the first AP.

In conjunction with the fourth aspect and the first possible implementing way to the fourth possible implementing way of the fourth aspect, in a fifth possible implementing way of the fourth aspect, the data load may be a downlink data load, or a load sum of an uplink data load and a downlink data load.

In conjunction with the fourth aspect and the first possible implementing way to the fifth possible implementing way of the fourth aspect, in a sixth possible implementing way of the fourth aspect, the first STA may further include:

a second interference determining module, configured to determine that the frequency interference exists between the first STA and the second STA, based on a signal strength of any one or a combination of a management frame, a control frame and a data frame, where the management frame, the control frame and the data frame are sent by the second AP.

With the interference processing method and device according to the embodiments of the present application, the first access point (AP) receives the frame from the second AP, where the frame carries the downlink data load of the second AP; and the first AP adjusts the channel bandwidth for performing the data communication with the station, based on the downlink data load of the first AP and the downlink data load of the second AP, to reduce the probability that the first AP and the second AP transmit data in the same channel, thereby reducing frequency interference between AP devices in the OBSS.

BRIEF DESCRIPTION OF THE DRAWINGS

The drawings to be used in the description of embodiments and the conventional art will be described briefly as follows, so that the technical solutions according to the embodiments of the present application or the conventional art will become clearer. It is apparent that the drawings in the following description merely describe some embodiments of the present application. For those skilled in the art, other drawings may be obtained without any creative work according to these drawings.

FIG. 1 is a schematic diagram of a first embodiment of an application scenario of an interference processing method according to the present application;

FIG. 2 is a schematic diagram of a second embodiment of the application scenario of an interference processing method according to the present application;

FIG. 3 is a schematic flowchart of a first embodiment of an interference processing method according to the present application;

FIG. 4 is a schematic diagram of a format of an information element carrying downlink data load information;

FIG. 5 is a schematic flowchart of a second embodiment of the interference processing method according to the present application;

FIG. 6 is a schematic flowchart of a third embodiment of an interference processing method according to the present application;

FIG. 7 is a schematic structural diagram of a first embodiment of a first access point according to the present application;

DETAILED DESCRIPTION OF THE EMBODIMENTS

Figure 8:
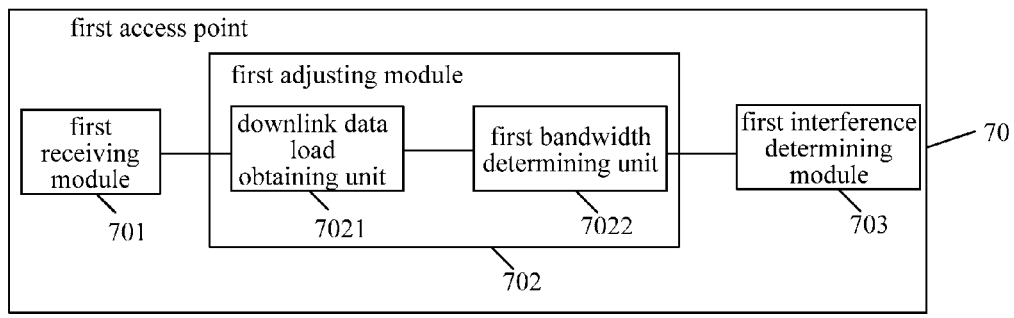
FIG. 8 is a schematic structural diagram of a second embodiment of the first access point according to the present application.

To make the object, technical solutions and advantages of the present application clearer, the technical solutions according to the embodiments of the present application will be described clearly and completely as follows in conjunction with the accompany drawings in the embodiments of the present application. It is apparent that the described embodiments are only a part of the embodiments according to the present application rather than all the embodiments. Any other embodiments obtained by those skilled in the art based on the embodiments in the present application without any creative work fall within the scope of protection of the present application.

In an embodiment, an interference processing method is described in detail, on the condition that two BSSes have an overlapping coverage area. In an implementing process, those skilled in the art should understand that the embodiment is not only applicable to a case that two BSSes have an overlapping coverage area, but also applicable to a case that multiple BSSes have overlapping coverage areas.

In an implementing process, an OBSS formed by BSS1 and BSS2 may include two specific scenarios. FIG. 1 is a schematic diagram of a first embodiment of an application scenario of an interference processing method according to the present application. As shown in FIG. 1, a signal coverage overlapping area is formed by a first AP (AP1) belonging to the BSS1 and a second AP (AP2) belonging to the BSS2, and a first STA associated with the first AP and a second STA associated with the second AP are located in the signal coverage overlapping area. In the signal coverage overlapping area, the first STA (STAT) or the second STA (STA2) can receive a control frame, a management frame and a data frame and the like broadcast by the first AP and the second AP. FIG. 2 is a schematic diagram of a second embodiment of the application scenario of the interference processing method according to the present application. In this scenario, besides the case based on the embodiment as shown in FIG. 1, and the first AP (AP1) can monitor the control frame, the management frame and the data frame and the like broadcast by the second AP (AP2), or the second AP can monitor the control frame, the management frame and the data frame and the like broadcast by the first AP (AP1).

In the signal coverage overlapping area, it is required to ensure normal communication between the first AP and the first STA, and normal communication between the second AP and the second STA, but no active communication between the first AP and the second AP. In two scenarios as shown in FIGS. 1 and 2, communication processes between a respective AP and STA associated therewith are the same. In the conventional art, since OBSSes operate on the same channel and there is the signal coverage overlapping area, the first AP and the second AP may send data on the same channel, and the first STA and the second STA may send data on the same channel, thereby resulting in great frequency interference. In the embodiment, taking the first AP and the first STA as an example, the following case is described in detail: how to reduce the frequency interference in the communication process between the respective AP and the STA in the signal coverage overlapping area in the two scenarios as shown in FIGS. 1 and 2.

FIG. 3 is a schematic flowchart of a first embodiment of an interference processing method according to the present application. The interference processing method according to the embodiment may be implemented by an apparatus for performing the interference processing method. The apparatus may be embodied by software and/or hardware, and may be any AP device, which is referred to as a first AP in the embodiment for convenience of description. As shown in FIG. 3, the method according to the embodiment may include steps 301 and 302.

In step 301, a first access point (AP) receives a frame sent by a second AP, where the frame carries a downlink data load of the second AP, and frequency interference exists between the first AP and the second AP.

In the embodiment, the following case is described in detail: in the scenarios as shown in FIGS. 1 and 2, the first AP performs data communication with an STA associated therewith, that is, the first AP sends data to the first STA at first.

Before step 301, the first AP needs to determine whether the frequency interference exists between the first AP and the second AP. Step 301 is performed, if it is determined that the frequency interference exists between the first AP and the second AP.

In an implementing process, the second AP and an STA associated with the second AP may send any one or a combination of a management frame, a control frame and a data frame to the first AP in a unicasting or broadcasting manner. The first AP may determine that the frequency interference exists between the first AP and the second AP, based on a signal strength of any one or the combination of the management frame, the control frame and the data frame, which are sent by at least one of the second AP and the STA associated with the second AP. In an implementation, it is indicated that the frequency interference exists between the first AP and the second AP, in the case that the first AP receives any one or a combination of the management frame, the control frame and the data frame which are sent by the second AP and the STA associated with the second AP, and the signal strength is greater than a preset threshold. The control frame may be an RTS frame or a CTS frame. In particular, during a process of receiving a data frame, the first AP firstly stores a MAC address of the second AP or the STA associated with the second AP, based on the control frame. Then, when receiving the data frame sent by the second AP or the STA associated with the second AP, the first AP determines whether the data frame is sent by the second AP or by the STA associated with the second AP, based on the MAC address.

Step 301 is performed by the first AP, in the case that the first AP determines that the frequency interference exists between the first AP and the second AP. In an implementing process, the first AP or the second AP monitors a downlink data load in the BSS, where the downlink data load is a total length of downlink data frames of respective AP and all the STAs associated therewith. Then, the first AP or the second AP broadcasts periodically a message frame. The first AP may receive the frame broadcasted by the second AP, in a monitoring manner. The frame carries the downlink data load of the second AP, which may be a management frame.

In an implementation, a management frame defined in 802.11 protocol includes a frame head and a frame body. Specifically, the frame body includes a fixed field and a series of information elements (IE). The IE includes three parts as follows: an element identification (Element ID) field of one byte, a length (Length) field of one byte and an information (Information) field with a variable length. As a management frame, a Beacon frame may carry multiple IEs which may carry different information.

FIG. 4 is a schematic diagram of a format of an information element carrying downlink data load information. As shown in FIG. 4, the information element includes an element identification field, a length field, and a load field. Optionally, the element identification (Element ID) field of one byte may be adapted to label the information element uniquely. Currently, in 802.11 standard, ID numbers 222 to 255 are reserved and not used, thus the element ID may be 222. The length field of one byte is adapted to label a length of the IE; and the information field with the variable length is adapted to indicate load information.

In step 302, the first AP adjusts a channel bandwidth for performing data communication with a station (STA), based on a downlink data load of the first AP and the downlink data load of the second AP, to reduce a probability that the first AP and the second AP transmit data in the same channel.

In an implementing process, the first AP obtains a load sum of the downlink data load of the first AP and the downlink data load of the second AP. The first AP determines a relationship of values between the load sum and a first preset load and a relationship of values between the load sum and a second preset load, and adjusts the channel bandwidth for performing the data communication with the STA based on the relationships of the values, where the first preset load is less than the second preset load.

In the embodiment, the first preset load and the second preset load are set, by which the channel bandwidth may be adjusted based on a load, to ensure that a channel bandwidth used by the first AP may meet load requirements of the first AP and the second AP. Specifically, values of the first preset load and the second preset load may be determined according to experience, which is not limited in the embodiment. In practice, the first AP determines the relationships of values between the load sum and the first preset load and between the load sum and the second preset load, and adjusts the channel bandwidth for performing the data communication with the STA based on the relationships and the values; specifically, the adjustment may be performed according to a carrier sense multiple access with collision avoidance mechanism or according to a load proportion between the first AP and the second AP. In this way, the first AP and the second AP may select different channels at the same transmission time, or the first AP and the second AP select the same channel at different time, thereby reducing a probability that the first AP and the second AP transmit data in the same channel.

Those skilled in the art should understand that, uplink data and downlink data are transmitted on the same channel in the case that the first AP performs the data communication with the STA. Hence, when the first AP triggers the data communication at first, the first AP adjusts the channel bandwidth for performing the data communication with the station (STA), and then sends to the STA a notification message including information on the adjusted channel bandwidth. Thus, the STA performs the data communication with the first AP in the adjusted channel bandwidth. In particular, the notification message may be carried in a frame head of a data frame sent by the first AP to the STA. Those skilled in the art should understand that, in the embodiment, the STA for performing the data communication with the first AP may be either an STA in the signal coverage overlapping area, or an STA outside the signal coverage overlapping area.

With the interference processing method according to the embodiment of the present application, the frame sent by the second access point (AP) is received by the first AP, where the frame carries the downlink data load of the second AP. The first AP adjusts the channel bandwidth for performing the data communication with the station (STA), based on the downlink data load of the first AP and the downlink data load of the second AP, to reduce the probability that the first AP and the second AP transmit data in the same channel, thereby reducing the frequency interference between AP devices in the OBSS.

FIG. 5 is a schematic flowchart of a second embodiment of the interference processing method according to the present application. The interference processing method according to the embodiment may be implemented by an apparatus for performing the interference processing method. The apparatus may be embodied by software and/or hardware, and may be any AP device, which is referred to as a second AP in the embodiment for convenience of description. As shown in FIG. 5, the method according to the embodiment may include step 501.

In step 501, the second AP sends a frame to a first AP, where the frame carries a downlink data load of the second AP. The first AP adjusts a channel bandwidth for performing data communication with a station (STA), based on a downlink data load of the first AP and the downlink data load of the second AP, where frequency interference exists between the first AP and the second AP.

In an implementing process, the second AP monitors a downlink data load in the BSS, and sends a frame to the first AP in a unicasting or broadcasting manner, where the frame carries the downlink data load of the second AP. Thus, the first AP adjusts the channel bandwidth for performing the data communication with the station (STA), based on the downlink data load of the first AP and the downlink data load of the second AP.

Those skilled in the art should understand that, in an implementing process, the first AP and the second AP is not limited strictly, and any AP may have functions of both the first AP and the second AP. For convenience of description, in the embodiment, APs are divided into the first AP and the second AP.

With the interference processing method according to the embodiment, the second AP sends the frame to the first AP, where the frame carries the downlink data load of the second AP. The first AP adjusts the channel bandwidth for performing the data communication with the station (STA), based on the downlink data load of the first AP and the downlink data load of the second AP, to reduce the probability that the first AP and the second AP transmit data in the same channel, thereby reducing frequency interference between AP devices in the OBSS.

A technical solution of the method embodiment as shown in FIG. 3 is described in detail by several specific embodiments and in conjunction with the embodiment in FIG. 5. In an implementing process, the first AP determines relationships of values between the load sum and a first preset load and between the load sum and a second preset load, and adjusts the channel bandwidth for performing the data communication with the STA based on the relationships of the values, which may be implemented by the following possible ways.

In a possible implementing way, the first AP determines that the channel bandwidth for performing the data communication with the STA is a maximum channel bandwidth; contends for a channel according to a carrier sense multiple access with collision avoidance mechanism; and adjusts the channel bandwidth for performing the data communication with the STA to the maximum channel bandwidth, in the case that the first AP determines that the load sum is less than or equal to the first preset load.

In an implementing process, it is indicated that downlink data traffic of the first AP and downlink data traffic of the second AP are small, and the first AP determines that the channel bandwidth for performing the data communication with the STA associated therewith is a maximum channel bandwidth, in the case that the first AP determines that the load sum is less than or equal to the first preset load. In the conventional art, in 5.8 GHz frequency band, WLAN may support four kinds of channel bandwidth 20 MHz, 40 MHz, 80 MHz and 160 MHz, where 20 MHz, 40 MHz and 80 MHz are required to support, and 160 MHz is optional. In the 5.8 GHz frequency band, WLAN has only two orthogonal channels of 160 MHz, and hence the bandwidth of 160 MHz is avoided to be used in an OBSS scenario. In the 5.8 GHz frequency band, WLAN has five orthogonal channels of 80 MHz, and hence the maximum channel bandwidth is selected as 80 MHz. Those skilled in the art should understand that, in an implementing process, when the maximum bandwidth is selected, an allowable error range is considered, that is, the practically selected maximum bandwidth may be 80±10 MHz. The first AP contends for a channel with the second AP according to a carrier sense multiple access with collision avoidance mechanism, and adjusts the channel bandwidth for performing the data communication with the STA to the maximum channel bandwidth, in the case that the first AP determines that the channel bandwidth for performing the data communication with the STA associated therewith is the maximum channel bandwidth.

In wireless local area network standard 802.11, the Carrier Sense Multiple Access with Collision Avoidance (CSMA/CA) mechanism is improved. A work flow of the CSMA/CA is that: when transmitting data in a wireless network (bandwidth of 80 MHz), the first AP waits for a period of time and selects randomly a time slice to detect data transmission again if it is detected that no data is transmitted in the network; the data is send out if there is still no data transmission in the wireless network, thereby avoiding that the first AP sends the data in the same channel with the second AP. An STA associated with the first AP sends an ACK frame back, after correctly receiving data sent by the first AP. A process of sending the data is completed if the ACK frame is received by the first AP. If the ACK frame is not received by the first AP, the data is not received correctly or the ACK frame fails to be sent. In this case, the first AP retransmits the data packet after waiting for a period of time.

In the embodiment, the first AP contends for a channel with the second AP according to the CSMA/CA. It is ensured that the first AP performs data communication with the STA in the maximum bandwidth and it is avoided that the first AP and the second AP transmit data in the same channel, thereby eliminating the frequency interference.

In another possible implementing way, the first AP determines that the channel bandwidth for performing the data communication with the STA is the maximum channel bandwidth; determines an access probability for accessing the maximum channel bandwidth, based on a load proportion between the downlink data load of the first AP and the downlink data load of the second AP; and determines that an access value generated randomly by the first AP is less than the access probability; and adjusts the channel bandwidth for performing the data communication with the STA to the maximum channel bandwidth, in the case that the first AP determines that the load sum is greater than the first preset load and is less than or equal to the second preset load.

In an implementing process, it is indicated that downlink data traffic of the first AP and downlink data traffic of the second AP are moderate and the first AP determines that the channel bandwidth for performing the data communication with the STA associated therewith is a maximum channel bandwidth, in the case that the first AP determines that the load sum is greater than the first preset load and is less than or equal to the second preset load. If a load proportion between the downlink data load of the first AP and the downlink data load of the second AP is 2:3, an access probability of the first AP accessing the maximum channel bandwidth is 40% and an access probability of the second AP accessing the maximum channel bandwidth is 60%. Before the first AP contends for the channel having the maximum bandwidth with the second AP, the first AP and the second AP respectively generates access values randomly, where each of the access values is greater than or equal to 0.1, and less than or equal to 1. The first AP is allowed to contend for the channel having the maximum bandwidth according to the CSMA/CA mechanism, in the case that the access value generated by the first AP is less than or equal to 0.4; otherwise, the first AP is not allowed to contend for the channel having the maximum bandwidth. The second AP is allowed to contend for the channel having the maximum bandwidth according to the CSMA/CA mechanism, in the case that the access value generated by the second AP is less than or equal to 0.6; otherwise, the second AP is not allowed to contend for the channel having the maximum bandwidth.

In the embodiment, the first AP determines the access probability for accessing the maximum channel bandwidth, based on the load proportion between the downlink data load of the first AP and the downlink data load of the second AP; determines that the access value generated randomly by the first AP is less than the access probability; and adjusts the channel bandwidth for performing the data communication with the STA to the maximum channel bandwidth, thereby reducing the probability that the first AP and the second AP transmit data in the same channel.

In still another possible implementing way, the first AP adjusts the channel bandwidth for performing the data communication with the STA to a bandwidth of a preset sub-channel; or determines the channel bandwidth for performing the data communication with the STA, based on a load proportion between the downlink data load of the first AP and the downlink data load of the second AP, in the case that the first AP determines that the load sum is greater than the second preset load.

In an implementing process, the first AP determines an available preset sub-channel, and then adjusts the channel bandwidth for performing the data communication with the STA to a bandwidth of the preset sub-channel, in a case that the first AP determines that the load sum is greater than the second preset load. The preset sub-channel may be obtained by dividing the maximum bandwidth of 80 MHz into a sub-channel of 20 MHz, a sub-channel of 40 MHz, or a combination of the sub-channel of 20 MHz and the sub-channel of 40 MHz. The available preset sub-channel may be determined by the first AP in possible cases as follows.

In a possible case, the first AP selects randomly the preset sub-channel from the channel. In practice, the first AP will scan a condition of the sub-channels selected by other nearby APs before selecting the preset sub-channel. If the first AP determines there is no other AP by scanning, the first AP may arbitrarily select a channel of 20 MHz or 40 MHz from the channel of 80 MHz as the sub-channel, or the first AP may select the sub-channel according to a certain rule, for example, a sub-channel having the highest signal-to-noise ratio.

In another possible case, the first AP determines a sub-channel selected by the second AP, and selects a sub-channel other than the sub-channel in the channels as the preset sub-channel. In an implementing process, the second AP broadcasts a sub-channel notification frame to the first AP, the first AP receives the sub-channel notification frame broadcast the second AP, where the sub-channel notification frame carries the sub-channel selected by the second AP. Alternatively, the first AP sends a sub-channel request frame to the second AP, the second AP receives the sub-channel request frame sent by the first AP and sends a sub-channel response frame to the first AP; and the first AP receives the sub-channel response frame sent by the second AP, where the sub-channel response frame carries the sub-channel selected by the second AP. Alternatively, in the case that the first AP can not receive the sub-channel notification frame sent by the second AP, the first AP sends a measurement request frame to the STA associated with the first AP; the STA may receive the sub-channel notification frame broadcast by the second AP when the STA is located in a signal coverage overlapping area; then the STA sends a measurement response frame to the first AP, the first AP receives the measurement response frame sent by the STA, where the measurement response frame carries the sub-channel selected by the second AP. Those skilled in the art should understand that, "the STA associated with the first AP" herein may be not only an STA which is performing the data communication with the first AP, but also other STAs associated with the first AP.

After determining the sub-channel selected by the second AP, the first AP selects a sub-channel other than the sub-channel in the channel, as the preset sub-channel. For example, in the case that the channel of the maximum bandwidth of 80 MHz is divided into four sub-channels of 20 MHz, if the second AP selects the first channel of 20 MHz as a sub-channel of the second AP, the first AP may select another sub-channel orthogonal to the sub-channel selected by the second AP, as the preset sub-channel of the first AP. The first AP may select one from the second sub-channel, the third sub-channel and the fourth sub-channel, rather than the same sub-channel selected by the second AP. In the embodiment, the first AP adjusts the channel bandwidth for performing the data communication with the STA to the bandwidth of the preset sub-channel, hence it is avoided that the first AP and the second AP transmit data in the same channel.

In another possible implementing process, the first AP determines the channel bandwidth for performing the data communication with the STA, based on a relationship of load value between the downlink data load of the first AP and the downlink data load of the second AP; and adjusts the channel bandwidth for performing the data communication with the STA, to a channel bandwidth determined by the first AP based on the relationship of the load value, in the case that the first AP determines that the load sum is greater than the second preset load.

In an implementing process, the first AP determines that the channel bandwidth for performing the data communication with the STA is less than the maximum channel bandwidth, in the case that the first AP determines that the downlink data load of the first AP is less than the downlink data load of the second AP. The first AP determines that the channel bandwidth for performing the data communication with the STA is the maximum channel bandwidth, in the case that the first AP determines that the downlink data load of the first AP is greater than the downlink data load of the second AP. For example, when determining that the downlink data load of the first AP is greater than the downlink data load of the second AP, the first AP performs the data communication with the associated STA in a bandwidth of 80 MHz. In this case, the second AP having less downlink data load amount performs communication in a part of the bandwidth. Those skilled in the art should understand that, the first AP determines to adopt a part of the bandwidth to perform the communication, when determining that the downlink data load of the first AP is less than the downlink data load of the second AP. In this case, since a transmission rate for 80 MHz is fast and a transmission rate of communication adopting the part of the bandwidth is slow, the transmission time is reduced, and the frequency interference time is reduced, comparing with the case that the first AP and the second AP transmit data in the same channel.

In summary, with the interference processing method according to the embodiment, the probability that the first AP and the second AP transmit data in the same channel is reduced, and the frequency interference between the first AP and the second AP is eliminated or reduced.

FIG. 6 is a schematic flowchart of a third embodiment of the interference processing method according to the present application. The interference processing method according to the embodiment may be implemented by an apparatus for performing the interference processing method. The apparatus may be embodied by software and/or hardware, and may be any STA device, which is referred to as a first STA in the embodiment for convenience of description. As shown in FIG. 6, the method according to the embodiment may include the following steps.

In step 601, the first station (STA) receives a first frame sent by a first access point (AP), where the first frame carries a data load of the first AP.

In step 602, the first STA receives a second frame sent by a second AP, where the second frame carries a data load of the second AP.

In step 603, the first STA adjusts a channel bandwidth for performing data communication with the first AP, based on the data load of the first AP and the data load of the second AP, to reduce a probability that the first STA and the second STA transmit data in a same channel.

Same frequency interference exists between the first STA and the second STA.

The following case is described in detail in the embodiment: in the scenarios as shown in FIGS. 1 and 2, the first STA performs the data communication with the first AP, that is, the first STA sends data to the first AP at first.

Before step 601, the first STA needs to determine whether frequency interference exists between the first STA and the second STA. Specifically, the second AP sends any one or a combination of a management frame, a control frame and a data frame in a unicasting or broadcasting manner. The first STA determines that the frequency interference exists between the first STA and the second STA, in the case that the first STA receives any one or the combination of the management frame, the control frame and the data frame which are sent by the second AP in a monitoring manner, and a signal strength of any one or the combination of the management frame, the control frame and the data frame which are sent by the second AP is greater than a preset intensity.

In addition, in step 601, the first AP periodically sends a first frame to the first STA in a broadcasting manner, and the first STA receives the first frame sent by the first AP in a monitoring manner, where the first massage frame carries the data load of the first AP.

In step 602, the second AP periodically sends the second frame to the first STA in a broadcasting manner, and the first STA receives the second frame sent by the second AP in a monitoring manner, where the second massage frame carries the data load of the second AP.

Those skilled in the art should understand that a specific format of the frame described herein may refer to the embodiment as shown in FIG. 4, which will be omitted herein.

Those skilled in the art should understand that there is no strict sequential relationship between step 601 and step 602 in the embodiment.

In an implementing process, the data load includes possible implementing ways as follows. In a possible implementing way, the data load is the downlink data load, that is, the data load is all the downlink data loads of the first AP or the second AP.

In another possible implementing way, the data load is a load sum of uplink and downlink data loads. In an implementing process, each STA sends the uplink data load to the first AP or second AP associated therewith in a unicasting manner. That is, the first STA sends the uplink data load to the associated first AP, and the second STA sends the uplink data load the associated second AP. The first AP or the second AP obtains the load sum of the uplink data loads based on the uplink data load sent by the respective associated STA, then obtains the load sum of uplink and downlink data loads based on the downlink data load of the first AP or the second AP.

In step 603, the first STA adjusts the channel bandwidth for performing the data communication with the first AP, based on the data load of the first AP and the data load of the second AP.

In an implementing process, the first STA obtains a load sum of the data load of the first AP and the data load of the second AP.

The first STA determines relationships of values between the load sum and a first preset load and between the load sum and a second preset load; and adjusts the channel bandwidth for performing the data communication with the first AP based on the relationships of the values, where the first preset load is less than the second preset load. Those skilled in the art should understand that meanings of the first preset load and the second preset load are similar to that in the embodiments described above, which will be omitted herein in the embodiment.

Those skilled in the art should understand that, the uplink data and the downlink data are transmitted in the same channel in the process of the data communication between the first AP and the second AP. Hence, once the first STA triggers the data communication at first, the first STA adjusts the channel bandwidth for performing the data communication with the first AP, and then sends to the first AP a notification message including information on the adjusted channel bandwidth. Thus, the first AP performs the data communication with the first STA in the adjusted channel bandwidth.

With the interference processing method according to the embodiment, the first station (STA) receives the first frame sent by the first AP; receives the second frame sent by the second AP; adjusts the channel bandwidth for performing the data communication with the first AP, based on the data load of the first AP and the data load of the second AP, to reduce the probability that the first STA and the second STA transmit data in the same channel.

A technical solution of the method embodiment as shown in FIG. 6 is described in detail by several specific embodiments. In an implementing process, the first STA determines relationships of values between the load sum and the first preset load and between the load sum and the second preset load, and adjusts the channel bandwidth for performing the data communication with the first AP based on the relationships of the value, which may include possible implementing ways as follows.

In a possible implementing way, the first STA determines that the channel bandwidth for performing the data communication with the first AP is a maximum channel bandwidth; and contends for a channel according to a carrier sense multiple access with collision avoidance mechanism; and adjusts the channel bandwidth for performing the data communication with the first AP to the maximum channel bandwidth, in the case that the first STA determines that the load sum is less than or equal to the first preset load.

In an implementing process, when the first STA determines that the load sum is less than or equal to the first preset load, it is indicated that transmitted uplink data traffic of the first STA and the second STA is less, and the first STA determines that the channel bandwidth for performing the data communication with the associated first AP is the maximum channel bandwidth. The first STA contends for a channel with the second STA according to the carrier sense multiple access with collision avoidance mechanism, and adjusts the channel bandwidth for performing the data communication with the first AP to the maximum channel bandwidth. An implementing process of the carrier sense multiple access with collision avoidance mechanism is similar to that in the above embodiments, which will be omitted herein.

In the embodiment, the first STA contends for a channel with the second STA according to the CSMA/CA. Thus, it is ensured that the first STA performs the data communication with the first AP in the maximum bandwidth and it is avoided that the first STA and the second STA transmit data in the same channel, thereby eliminating the frequency interference.

In another possible implementing way, the first STA determines that the channel bandwidth for performing the data communication with the first AP is the maximum channel bandwidth; determines an access probability for accessing the maximum channel bandwidth, based on a load proportion between the data load of the first AP and the data load of the second AP; determines that an access value generated randomly by the first STA is less than the access probability; and adjusts the channel bandwidth for performing the data communication with the first AP to the maximum channel bandwidth, in the case that the first STA determines that the load sum is greater than the first preset load and is less than or equal to the second preset load.

In an implementing process, when the first STA determines that the load sum is greater than the first preset load and is less than or equal to the second preset load, it is indicated that a transmitted data traffic is moderate, and the first STA determines that the channel bandwidth for performing the data communication with the associated first AP is a maximum channel bandwidth. A load proportion between the data load of the first AP and the data load of the second AP is 2:3, and thus an access probability of the first STA for accessing the maximum channel bandwidth is 40% and an access probability of the second STA for accessing the maximum channel bandwidth is 60%. Before the first STA contends for the channel having the maximum bandwidth with the second STA, the first STA and the second STA respectively generates access values randomly, where each of the access values is greater than or equal to 0.1, and less than or equal to 1. The first STA is allowed to contend for the channel having the maximum bandwidth according to the CSMA/CA mechanism, in the case that the access value generated by the first STA is less than or equal to 0.4; otherwise, the first STA is not allowed to contend for the channel having the maximum bandwidth. The second STA is allowed to contend for the channel having the maximum bandwidth according to the CSMA/CA mechanism, in the case that the access value generated by the second STA is less than or equal to 0.6; otherwise, the second STA is not allowed to contend for the channel having the maximum bandwidth.

In the embodiment, the first STA determines the access probability for accessing the maximum channel bandwidth, based on the load proportion between the data load of the first AP and the data load of the second AP; determines that the access value generated randomly by the first AP is less than the access probability; and adjusts the channel bandwidth for performing the data communication with the first AP to the maximum channel bandwidth, thereby reducing the probability that the first STA and the second STA transmit data in the same channel.

In still another possible implementing way, the first STA receives a sub-channel notification frame sent by the first AP, where the sub-channel notification frame carries the sub-channel selected by the first AP; adjusts the channel bandwidth for performing the data communication with the first AP to a bandwidth of a preset sub-channel; or determines the channel bandwidth for performing the data communication with the first AP, based on a relationship of load value between the data load of the first AP and the data load of the second AP, in the case that the first STA determines that the load sum is greater than the second preset load.

In an implementing process, when determining that the load sum is greater than the second preset load, the first STA receives the sub-channel notification frame sent by the first AP in a broadcasting manner in advance, where the sub-channel notification frame carries the sub-channel selected by the first AP, then the first STA adjusts the channel bandwidth for performing the data communication with the first AP to a bandwidth of a preset sub-channel. The sub-channel selected by the first AP is different from the sub-channel selected by the second AP. The first AP selecting the sub-channel selected in advance may be a possible way for selecting the channel for performing the data communication between the first STA and the first AP. In the embodiment, the channel bandwidth for performing the data communication with the first AP is adjusted to the bandwidth of the preset sub-channel, thereby avoiding that the first STA and the second STA transmit data in the same channel.

In another possible implementing process, the first STA determines the channel bandwidth for performing the data communication with the first AP based on a relationship of load value between the data load of the first AP and the data load of the second AP; and adjusts the channel bandwidth for performing the data communication with the first AP, to a channel bandwidth determined by the first STA based on the load comparison, in the case that the first STA determines that the load sum is greater than the second preset load.

In an implementing process, the first STA determines that the channel bandwidth for performing the data communication with the first AP is less than the maximum channel bandwidth, in the case that the first STA determines that the data load of the first AP is less than the data load of the second AP; and the first STA determines that the channel bandwidth for performing the data communication with the first AP is the maximum channel bandwidth, in the case that the first STA determines that the data load of the first AP is greater than the data load of the second AP. That is, when determining that the data load of the first AP is greater than the data load of the second AP, the first STA performs the data communication with the associated first AP in a bandwidth of 80 MHz, and the second STA with less data load traffic performs communication in a part of the bandwidth. Those skilled in the art should understand that, the first STA determines to perform communication in a part of the bandwidth, when the first STA determines that the data load of the first AP is less than the data load of the second AP. In this case, since a transmission rate for 80 MHz is fast and a transmission rate of communication in the part of the bandwidth is slow, the time during which the first STA and the second STA transmit data in the same channel is shortened, and the frequency interference time is reduced.

In summary, with the interference processing method according to the embodiment, the probability that the first STA and the second STA transmit data in the same channel is reduced, and the frequency interference between the first STA and the second STA is eliminated or reduced.

FIG. 7 is a schematic structural diagram of a first embodiment of a first access point according to the present application. As shown in FIG. 7, a first access point 70 according to the embodiment of the present application includes a first receiving module 701 and a first adjusting module 702.

Specifically, the first receiving module 701 is configured to receive a frame sent by a second AP, where the frame carries a downlink data load of the second AP, and frequency interference exists between the first AP and the second AP.

The first adjusting module 702 is configured to adjust a channel bandwidth for performing data communication with a station (STA), based on a downlink data load of the first AP and the downlink data load of the second AP, to reduce a probability that the first AP and the second AP transmit data in the same channel.

The first AP in the embodiment may be configured to perform the technical solution of the method embodiment as shown in FIG. 3, and the implementation principle and technical effect are similar as the method embodiment as shown in FIG. 3, which will be omitted herein.

FIG. 8 is a schematic structural diagram of a second embodiment of the first access point according to the present application. The embodiment is implemented on a basis of the embodiment as shown in FIG. 7.

Optionally, the first adjusting module 702 may include units as follows.

A downlink data load obtaining unit 7021 is configured to obtain a load sum of the downlink data load of the first AP and the downlink data load of the second AP; and A first bandwidth determining unit 7022 is configured to determine relationships of values between the load sum and a first preset load and between the load sum and a second preset load, and adjust the channel bandwidth for performing the data communication with the STA based on the relationships of the values, where the first preset load is less than the second preset load.

Optionally, the first bandwidth determining unit 7022 may be configured to:

determine that the channel bandwidth for performing the data communication with the STA is a maximum channel bandwidth; contend for a channel according to a carrier sense multiple access with collision avoidance (CSMA/CA) mechanism; and adjust the channel bandwidth for performing the data communication with the STA to the maximum channel bandwidth, in a case that it is determined that the load sum is less than or equal to the first preset load;

determine that the channel bandwidth for performing the data communication with the STA is the maximum channel bandwidth; determine an access probability for accessing the maximum channel bandwidth, based on a load proportion between the downlink data load of the first AP and the downlink data load of the second AP; determine that an access value generated randomly by the first AP is less than the access probability; and adjust the channel bandwidth for data communication with the STA to the maximum channel bandwidth, in a case that it is determined that the load sum is greater than the first preset load and is less than or equal to the second preset load; or adjust the channel bandwidth for performing the data communication with the STA to a bandwidth of a preset sub-channel; or determine the channel bandwidth for performing the data communication with the STA, based on a relationship of load value between the downlink data load of the first AP and the downlink data load of the second AP; and adjust the channel bandwidth for performing the data communication with the STA, to a channel bandwidth determined by the first AP based on a load comparison in a case that it is determined that the load sum is greater than the second preset load.

Optionally, the first bandwidth determining unit 7022 may be further configured to:

determine that the channel bandwidth for performing the data communication with the STA is less than the maximum channel bandwidth, in a case that it is determined that the downlink data load of the first AP is less than the downlink data load of the second AP; or determine that the channel bandwidth for performing the data communication with the STA is the maximum channel bandwidth, in a case that it is determined that the downlink data load of the first AP is greater than the downlink data load of the second AP.

Optionally, the first bandwidth determining unit 7022 may be further configured to: before the channel bandwidth for performing the data communication with the STA is adjusted to a bandwidth of a preset sub-channel, select the preset sub-channel from the channels randomly; or determine a sub-channel selected by the second AP; and select a sub-channel other than the sub-channel in the channel as the preset sub-channel.

Optionally, the first bandwidth determining unit 7022 may be further configured to:

receive a sub-channel notification frame from the second AP, where the sub-channel notification frame carries the sub-channel selected by the second AP;

send a sub-channel request frame to the second AP, and receive a sub-channel response frame from the second AP, where the sub-channel response frame carries the sub-channel selected by the second AP; or send a measurement request frame to the STA, and receive a measurement response frame from the STA, where the measurement response frame carries the sub-channel selected by the second AP.

Optionally, the first AP may further include:

a first interference determining module 703, configured to determine that the frequency interference exists between the first AP and the second AP, based on a signal strength of any one or a combination of a management frame, a control frame and a data frame, where the management frame, the control frame and the data frame are sent by at least one of the second AP and an STA associated with the second AP.

The first AP in the embodiment may be configured to perform the technical solutions of the method embodiments described above, and the implementation principle and technical effect are similar as the above method embodiments, which will be omitted herein.

Figure 9:
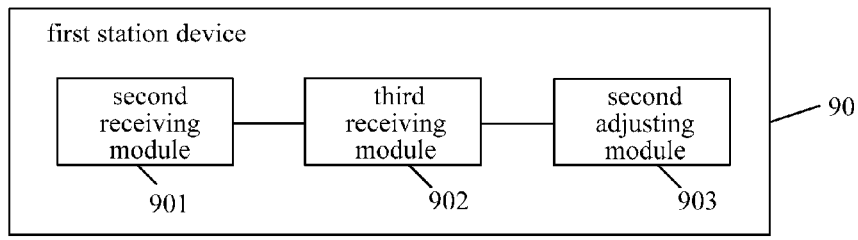
FIG. 9 is a schematic structural diagram of a first embodiment of a first station device according to the present application.

FIG. 9 is a schematic structural diagram of a first embodiment of a first station device according to the present application. As shown in FIG. 9, a first station device 90 according to the embodiment includes a second receiving module 901, a third receiving module 902 and a second adjusting module 903.

Specifically, the second receiving module 901 is configured to receive a first frame sent by a first access point (AP), where the first frame carries a data load of the first AP.

The third receiving module 902 is configured to receive a second frame from a second AP, where the second frame carries a data load of the second AP.

The second adjusting module 903 is configured to adjust a channel bandwidth for performing the data communication with the first AP, based on the data load of the first AP and the data load of the second AP, to reduce a probability that the first STA and a second STA transmit data in the same channel.

Same frequency interference exists between the first STA and the second STA.

The first STA in the embodiment may be configured to perform the technical solution of the method embodiment as shown in FIG. 6, and the implementation principle and technical effect are similar as the method embodiment as shown in FIG. 6, which will be omitted herein.

Figure 10:
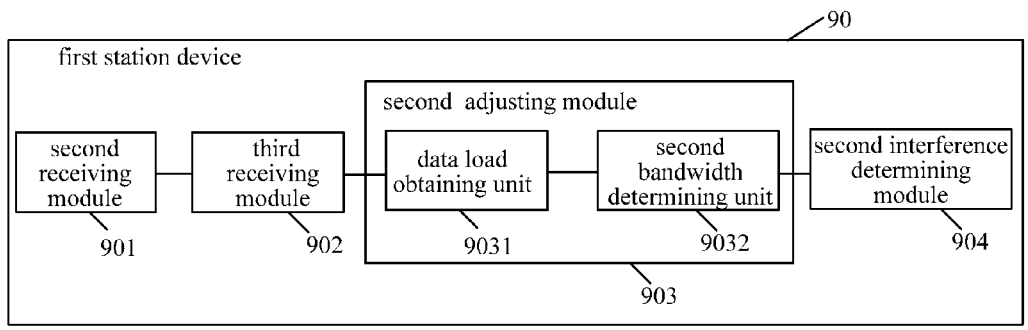
FIG. 10 is a schematic structural diagram of a second embodiment of the first station device according to the present application.

FIG. 10 is a schematic structural diagram of a second embodiment of the first station device according to the present application. The embodiment is implemented on a basis of the embodiment as shown in FIG. 9.

Optionally, the second adjusting module 903 may include units as follows.

A data load obtaining unit 9031 is configured to obtain a load sum of the data load of the first AP and the data load of the second AP.

A second bandwidth determining unit 9032 is configured to determine relationships of values between the load sum and a first preset load and between the load sum and a second preset load; and adjust the channel bandwidth for performing the data communication with the first AP based on the relationships of the values, where the first preset load is less than the second preset load.

Optionally, the second bandwidth determining unit 9032 may be configured to:

determine that the channel bandwidth for performing the data communication with the first AP is a maximum channel bandwidth; contend for a channel according to a carrier sense multiple access with collision avoidance (CSMA/CA) mechanism; and adjust the channel bandwidth for performing the data communication with the first AP to the maximum channel bandwidth, in a case that it is determined that the load sum is less than or equal to the first preset load;

determine that the channel bandwidth for performing the data communication with the first AP is the maximum channel bandwidth; determine an access probability for accessing the maximum channel bandwidth, based on a load proportion between the data load of the first AP and the data load of the second AP; determine that an access value generated randomly by the first STA is less than the access probability and adjust the channel bandwidth for performing the data communication with the first AP to the maximum channel bandwidth, in a case that it is determined that the load sum is greater than the first preset load and is less than or equal to the second preset load; or adjust the channel bandwidth for performing the data communication with the first AP to a bandwidth of a preset sub-channel; or determine the channel bandwidth for performing the data communication with the first AP, based on a relationship of load value between the data load of the first AP and the data load of the second AP; and adjust the channel bandwidth for performing the data communication with the first AP to a channel bandwidth determined by the first STA based on the relationship of the load value, in a case that it is determined that the load sum is greater than the second preset load.

Optionally, the second bandwidth determining unit 9032 may be further configured to:

determine that the channel bandwidth for performing the data communication with the first AP is less than the maximum channel bandwidth, in a case that it is determined that the data load of the first AP is less than the data load of the second AP; or determine that the channel bandwidth for performing the data communication with the first AP is the maximum channel bandwidth, in a case that it is determined that the data load of the first AP is greater than the data load of the second AP.

Optionally, the second bandwidth determining unit 9032 may be further configured to: before the channel bandwidth for performing the data communication with the first AP is adjusted to the bandwidth of the preset sub-channel, receive a sub-channel notification frame from the first AP, where the sub-channel notification frame carries a preset sub-channel selected by the first AP.

Optionally, the data load may be a downlink data load, or a load sum of an uplink data load and a downlink data load.

Optionally, the first STA may further include:

a second interference determining module 904, configured to determine that the frequency interference exists between the first STA and the second STA, based on a signal strength of any one or a combination of a management frame, a control frame and a data frame, where the management frame, the control frame and the data frame are sent by the second AP.

The first STA in the embodiment may be configured to perform the technical solutions of the method embodiments described above, and the implementation principle and technical effect are similar the above method embodiments, which will be omitted herein.

Figure 11:
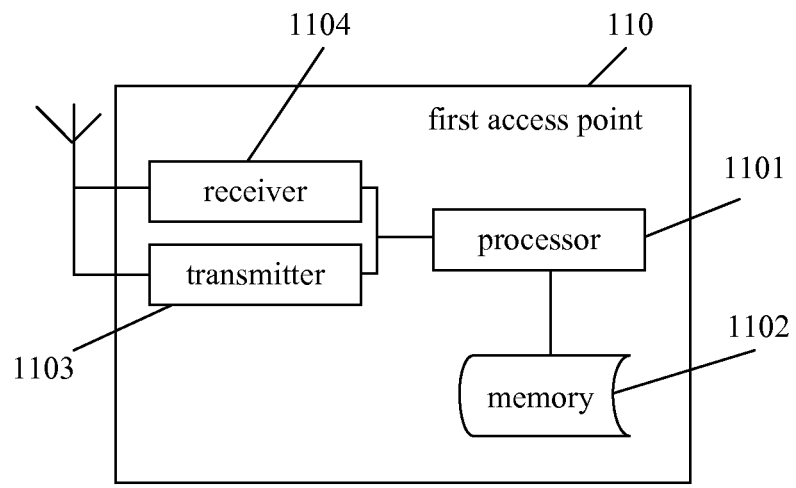
FIG. 11 is a schematic structural diagram of a third embodiment of the first access point according to the present application.

FIG. 11 is a schematic structural diagram of a third embodiment of the first access point according to the present application. As shown in FIG. 11, a first access point 110 according to the embodiment includes a processor 1101 and a memory 1102. The first access point 110 may further include a transmitter 1103 and a receiver 1104. The transmitter 1103 and the receiver 1104 may be connected to the processor 1101. The transmitter 1103 is configured to send data or information, the receiver 1104 is configured to receive data or information, and the memory 1102 is configured to store executable instructions. When the first access point 110 operates, the processor 1101 communicates with the memory 1102, and the processor 1101 invokes the executable instructions in the memory 1102 to perform following operations which includes:

receiving, by the first access point (AP), a frame sent by a second AP, where the frame carries a downlink data load of the second AP, and frequency interference exists between the first AP and the second AP.

adjusts a channel bandwidth for performing data communication with a station (STA) based on a downlink data load of the first AP and the downlink data load of the second AP, to reduce a probability that the first AP and the second AP transmit data in the same channel.

Optionally, the adjusting, by the first AP, a channel bandwidth for performing the data communication with a station (STA), based on a downlink data load of the first AP and the downlink data load of the second AP, which may include:

obtaining, by the first AP, a load sum of the downlink data load of the first AP and the downlink data load of the second AP; and determining, by the first AP, relationships of values between the load sum and a first preset load and between the load sum and a second preset load; and adjusting, by the first AP, the channel bandwidth for performing the data communication with the STA based on the relationships of values, where the first preset load is less than the second preset load.

Optionally, the determining, by the first AP, relationships of values between the load sum and a first preset load and between the load sum and a second preset load, and adjusts the channel bandwidth for performing the data communication with the STA based on the relationships of the values, which may include:

determining that the channel bandwidth for performing the data communication with the STA is a maximum channel bandwidth; contending for the channel according to a carrier sense multiple access with collision avoidance (CSMA/CA) mechanism; and adjusting the channel bandwidth for performing the data communication with the STA to the maximum channel bandwidth, in a case that the first AP determines that the load sum is less than or equal to the first preset load;

determining that the channel bandwidth for performing the data communication with the STA is the maximum channel bandwidth; determining an access probability for accessing the maximum channel bandwidth, based on a load proportion between the downlink data load of the first AP and the downlink data load of the second AP; determining that an access value generated randomly by the first AP is less than the access probability; and adjusting the channel bandwidth for performing the data communication with the STA to the maximum channel bandwidth, in a case that the first AP determines that the load sum is greater than the first preset load and is less than or equal to the second preset load;

adjusting the channel bandwidth for performing the data communication with the STA to a bandwidth of a preset sub-channel; or determining the channel bandwidth for performing the data communication with the STA, based on a relationship of load value between the downlink data load of the first AP and the downlink data load of the second AP; and adjusting the channel bandwidth for performing the data communication with the STA, to a channel bandwidth determined by the first AP based on a load comparison, in a case that the first AP determines that the load sum is greater than the second preset load.

Optionally, the determining, by the first AP, the channel bandwidth for performing the data communication with the STA, based on a relationship of load value between the downlink data load of the first AP and the downlink data load of the second AP may include:

determining that the channel bandwidth for performing the data communication with the STA is less than the maximum channel bandwidth, in a case that the first AP determines that the downlink data load of the first AP is less than the downlink data load of the second AP; or determining that the channel bandwidth for performing the data communication with the STA is the maximum channel bandwidth, in a case that the first AP determines that the downlink data load of the first AP is greater than the downlink data load of the second AP.

Optionally, before the adjusting, by the first AP, the channel bandwidth for performing the data communication with the STA to a bandwidth of a preset sub-channel, the method may further include:

selecting, by the first AP, the preset sub-channel from the channels randomly; or determining, by the first AP, a sub-channel selected by the second AP; and selecting a sub-channel other than the sub-channel in the channel, as the preset sub-channel.

Optionally, the determining, by the first AP, a sub-channel of the second AP may include:

receiving, by the first AP, a sub-channel notification frame from the second AP, where the sub-channel notification frame carries the sub-channel selected by the second AP;

sending, by the first AP, a sub-channel request frame to the second AP, and receiving, by the first AP, a sub-channel response frame from the second AP, where the sub-channel response frame carries the sub-channel selected by the second AP; or sending, by the first AP, a measurement request frame to the STA, and receiving, by the first AP, a measurement response frame from the STA, where the measurement response frame carries the sub-channel selected by the second AP.

Optionally, the method may further include:

determining, by the first AP, that the frequency interference exists between the first AP and the second AP, based on a signal strength of any one or a combination of a management frame, a control frame and a data frame, where the management frame, the control frame and the data frame are sent by at least one of the second AP and an STA associated with the second AP.

The first AP in the embodiment may be configured to perform the technical solutions of the method embodiments described above, and the implementation principle and technical effect are similar as the above method embodiments, which will be omitted herein.

Figure 12:
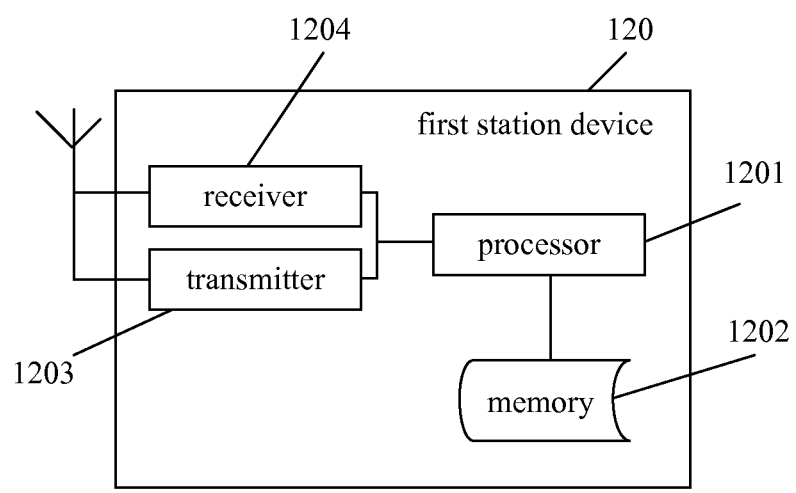
FIG. 12 is a schematic structural diagram of a fourth embodiment of the first station device according to the present application.

FIG. 12 is a schematic structural diagram of a fourth embodiment of the first station device according to the present application. As shown in FIG. 12, a first station device 120 according to the embodiment includes a processor 1201 and a memory 1202. The first station device 120 may further include a transmitter 1203 and a receiver 1204. The transmitter 1203 and the receiver 1204 may be connected to the processor 1201. The transmitter 1203 is configured to send data or information, the receiver 1204 is configured to receive data or information, and the memory 1202 is configured to store executable instructions. When the first station device 120 operates, the processor 1201 communicates with the memory 1202, and the processor 1201 invokes the executable instructions in the memory 1202 to perform following operations which includes:

receiving, by the first station (STA), a first frame from a first access point (AP), where the first frame carries a data load of the first AP;

receiving, by the first STA, a second frame from a second AP, where the second frame carries a data load of the second AP; and adjusting, by the first STA, a channel bandwidth for performing the data communication with the first AP, based on the data load of the first AP and the data load of the second AP, to reduce a probability that the first STA and the second STA transmit data in the same channel, where frequency interference exists between the first STA and the second STA.

Optionally, the adjusting, by the first STA, a channel bandwidth for performing the data communication with the first AP, based on the data load of the first AP and the data load of the second AP may include:

obtaining, by the first STA, a load sum of the data load of the first AP and the data load of the second AP; and determining, by the first STA, relationships of values between the load sum and a first preset load and between the load sum and a second preset load; and adjusting, by the first STA, the channel bandwidth for performing the data communication with the first AP based on the relationships of the values, where the first preset load is less than the second preset load.

Optionally, the determining, by the first STA, relationships of values between the load sum and a first preset load and between the load sum and a second preset load; and adjusting, by the first STA, the channel bandwidth for performing the data communication with the first AP based on the relationships of the values may include:

determining that the channel bandwidth for performing the data communication with the first AP is a maximum channel bandwidth; and contending for a channel according to a carrier sense multiple access with collision avoidance (CSMA/CA) mechanism; and adjusting the channel bandwidth for performing the data communication with the first AP to the maximum channel bandwidth, in a case that the first STA determines that the load sum is less than or equal to the first preset load;

determining that the channel bandwidth for performing the data communication with the first AP is the maximum channel bandwidth; determining an access probability for accessing the maximum channel bandwidth, based on a load proportion between the data load of the first AP and the data load of the second AP; determining that an access value generated randomly by the first STA is less than the access probability; and adjusting the channel bandwidth for performing the data communication with the first AP to the maximum channel bandwidth, in a case that the first STA determines that the load sum is greater than the first preset load and is less than or equal to the second preset load;

adjusting the channel bandwidth for performing the data communication with the first AP to a bandwidth of a preset sub-channel; or determining the channel bandwidth for performing the data communication with the first AP, based on a relationship of load value between the data load of the first AP and the data load of the second AP, and adjusting the channel bandwidth for performing the data communication with the first AP to a channel bandwidth determined by the first STA based on the relationship of the load value, in a case that the first STA determines that the load sum is greater than the second preset load.

Optionally, the determining, by the first STA, the channel bandwidth for performing the data communication with the first AP, based on a relationship of load value between the data load of the first AP and the data load of the second AP may include:

determining that the channel bandwidth for performing the data communication with the first AP is less than the maximum channel bandwidth, in a case that the first STA determines that the data load of the first AP is less than the data load of the second AP; or determining that the channel bandwidth for performing the data communication with the first AP is the maximum channel bandwidth, in a case that the first STA determines that the data load of the first AP is greater than the data load of the second AP.

Optionally, before the adjusting, by the first STA, the channel bandwidth for performing the data communication with the first AP to a bandwidth of a preset sub-channel, the method may further include:

receiving, by the first STA, a sub-channel notification frame from the first AP, where the sub-channel notification frame carries a preset sub-channel selected by the first AP.

Optionally, the data load may be a downlink data load or a load sum of an uplink data load and a downlink data load.

Optionally, the method may further include:

determining, by the first STA, that the frequency interference exists between the first STA and the second STA, based on a signal strength of any one or a combination of a management frame, a control frame and a data frame, where the management frame, the control frame and the data frame are sent by the second AP.

The first STA in the embodiment may be configured to perform the technical solutions of the method embodiments described above, and the implementation principle and technical effect are the similar as above method embodiments, which will be omitted herein.

In the embodiments according to the present application, it should be understood that the disclosed method and device may be implemented in other ways. For example, the device embodiments described above are only schematic. For example, the units or modules are divided based on a logic function thereof, and they may be divided in another way in practice. For example, multiple units or modules may be combined or integrated into another system, or some features may be omitted or not performed. In addition, a coupling, a direct coupling or a communication connection between displayed or discussed constitutional components may be an indirect coupling or a communication connection via some interfaces, devices or modules, and may be in an electrical form, a mechanical form or another form.

The modules illustrated as separate components may be separated physically or not, and the component displayed as a module may be a physical module or not. That is, the components may be located at the same place, or may be distributed on multiple network units, and a part of or all of the modules may be selected to realize the object of the solution of the embodiment according to actual need.

Those skilled in the art should understand that all of or a part of steps of the above method embodiments may be performed by instructing corresponding hardware through a program. The proceeding program may be stored in a computer readable storage medium. When being executed, the program performs the steps of the above method embodiments. The proceeding storage medium includes various mediums capable of storing program codes, such as a ROM, an RAM, a magnetic disc or an optic disc.

Finally, it should be noted that, the above embodiments are merely provided for describing the technical solutions of the present application, but are not intended to limit the present application. Although the present application is described in detail with reference to the foregoing embodiments, those skilled in the art should understand that, they can still modify technical solutions described in the foregoing embodiments, or make equivalent substitutions to a part or all of the technical features; and such modifications or substitutions do not enable the essence of corresponding technical solutions to depart from the scope of the embodiments of the present application.

What is claimed is:

1. An interference processing method, comprising:
   receiving, by a first access point (AP), a frame from a second AP, wherein the frame carries a downlink data load of the second AP, and frequency interference exists between the first AP and the second AP; and
   adjusting, by the first AP, a channel bandwidth for performing data communication with a station (STA), based on a downlink data load of the first AP and the downlink data load of the second AP, to reduce a probability that the first AP and the second AP transmit data in a same channel, wherein the adjusting, by the first AP, the channel bandwidth for performing the data communication with the STA comprises:
      obtaining, by the first AP, a load sum of the downlink data load of the first AP and the downlink data load of the second AP;
      determining, by the first AP, a first relationship of values between the load sum and a first preset load;
      determining, by the first AP, a second relationship of values between the load sum and a second preset load; and
      adjusting, by the first AP, the channel bandwidth for performing the data communication with the STA based on the first and second relationships of the values, wherein the first preset load is less than the second preset load.

2. The method according to claim 1, wherein the determining, by the first AP, the first and second relationships of values between the load sum and the first preset load and between the load sum and the second preset load, respectively; and adjusting, by the first AP, the channel bandwidth for performing the data communication with the STA based on the first and second relationships of the values comprises:
   in a case that the first AP determines that the load sum is less than or equal to the first preset load:
      determining that the channel bandwidth for performing the data communication with the STA is a maximum channel bandwidth; contending for a channel according to a carrier sense multiple access with collision avoidance (CSMA/CA) mechanism; and adjusting the channel bandwidth for performing the data communication with the STA to the maximum channel bandwidth;

in a case that the first AP determines that the load sum is greater than the first preset load and is less than or equal to the second preset load:
  determining that the channel bandwidth for performing the data communication with the STA is the maximum channel bandwidth; determining an access probability for accessing the maximum channel bandwidth, based on a load proportion between the downlink data load of the first AP and the downlink data load of the second AP; determining that an access value generated randomly by the first AP is less than the access probability; and adjusting the channel bandwidth for performing the data communication with the STA to the maximum channel bandwidth; and
in a case that the first AP determines that the load sum is greater than the second preset load:
  adjusting the channel bandwidth for performing the data communication with the STA to a bandwidth of a preset sub-channel; or determining the channel bandwidth for performing the data communication with the STA, based on the load comparison between the downlink data load of the first AP and the downlink data load of the second AP; and adjusting the channel bandwidth for performing the data communication with the STA, to a channel bandwidth determined by the first AP based on the relationship of the load value.

3. The method according to claim 2, wherein the determining, by the first AP, the channel bandwidth for performing the data communication with the STA, based on the load comparison between the downlink data load of the first AP and the downlink data load of the second AP comprises:
  determining that the channel bandwidth for performing the data communication with the STA is less than the maximum channel bandwidth, in a case that the first AP determines that the downlink data load of the first AP is less than the downlink data load of the second AP; or
  determining that the channel bandwidth for performing the data communication with the STA is the maximum channel bandwidth, in a case that the first AP determines that the downlink data load of the first AP is greater than the downlink data load of the second AP.

4. The method according to claim 2, wherein before the adjusting, by the first AP, the channel bandwidth for performing the data communication with the STA to a bandwidth of a preset sub-channel, the method further comprises:
  selecting, by the first AP, the preset sub-channel from the channel randomly; or
  determining, by the first AP, a sub-channel selected by the second AP; and selecting a sub-channel different from the sub-channel selected by the second AP in the channel, as the preset sub-channel.

5. The method according to claim 4, wherein the determining, by the first AP, a sub-channel selected by the second AP comprises:
  receiving, by the first AP, a sub-channel notification frame from the second AP, wherein the sub-channel notification frame carries the sub-channel selected by the second AP;
  sending, by the first AP, a sub-channel request frame to the second AP; and receiving, by the first AP, a sub-channel response frame from the second AP, wherein the sub-channel response frame carries the sub-channel selected by the second AP; or
  sending, by the first AP, a measurement request frame to the STA, and receiving, by the first AP, a measurement response frame from the STA, wherein the measurement response frame carries the sub-channel selected by the second AP.

6. The method according to claim 1, further comprising:
  determining, by the first AP, that the frequency interference exists between the first AP and the second AP, based on a signal strength of any one or a combination of a management frame, a control frame and a data frame, where the management frame, the control frame and the data frame are sent by at least one of the second AP and an STA associated with the second AP.

7. An interference processing method, comprising:
  receiving, by a first station (STA), a first frame from a first access point (AP), wherein the first frame carries a data load of the first AP;
  receiving, by the first STA, a second frame from a second AP, wherein the second frame carries a data load of the second AP; and
  adjusting, by the first STA, a channel bandwidth for performing data communication with the first AP, based on the data load of the first AP and the data load of the second AP, to reduce a probability that the first STA and the second STA transmit data in a same channel, wherein frequency interference exists between the first STA and the second STA, wherein the adjusting, by the first STA, the channel bandwidth for performing the data communication with the first AP comprises:
    obtaining, by the first STA, a load sum of the data load of the first AP and the data load of the second AP;
    determining, by the first STA, a first relationship of values between the load sum and a first preset load and a second relationship of values between the load sum and a second preset load; and
    adjusting, by the first STA, the channel bandwidth for performing the data communication with the first AP based on the first and second relationships of the values, wherein the first preset load is less than the second preset load.

8. The method according to claim 7, wherein the determining, by the first STA, the first and second relationships of values between the load sum and the first preset load and between the load sum and the second preset load, respectively; and adjusting, by the first STA, the channel bandwidth for performing the data communication with the first AP based on the first and second relationships of the values comprises:
  in a case that the first STA determines that the load sum is less than or equal to the first preset load:
    determining that the channel bandwidth for performing the data communication with the first AP is a maximum channel bandwidth; and contending for a channel according to a carrier sense multiple access with collision avoidance CSMA/CA mechanism; and adjusting the channel bandwidth for performing the data communication with the first AP to the maximum channel bandwidth;
  in a case that the first STA determines that the load sum is greater than the first preset load and is less than or equal to the second preset load:
    determining that the channel bandwidth for performing the data communication with the first AP is the maximum channel bandwidth; determining an access probability for accessing the maximum channel bandwidth, based on a load proportion between the data load of the first AP and the data load of the second AP; determining that an access value generated randomly by the first STA is less than the access probability; and adjusting the channel bandwidth for performing the data communication with the first AP to the maximum channel bandwidth; and in a case that the first STA determines that the load sum is greater than the second preset load:

adjusting the channel bandwidth for performing the data communication with the first AP to a bandwidth of a preset sub-channel; or determining the channel bandwidth for performing the data communication with the first AP based on a relationship of load value between the data load of the first AP and the data load of the second AP; and adjusting the channel bandwidth for performing the data communication with the first AP, to a channel bandwidth determined by the first STA based on the relationship of the load value.

9. The method according to claim 8, wherein the determining, by the first STA, the channel bandwidth for performing the data communication with the first AP, based on a relationship of load value between the data load of the first AP and the data load of the second AP comprises:

determining that the channel bandwidth for performing the data communication with the first AP is less than the maximum channel bandwidth, in a case that the first STA determines that the data load of the first AP is less than the data load of the second AP;

determining that the channel bandwidth for performing the data communication with the first AP is the maximum channel bandwidth, in a case that the first STA determines that the data load of the first AP is greater than the data load of the second AP.

10. The method according to claim 8, wherein before the adjusting, by the first STA, the channel bandwidth for performing the data communication with the first AP to a bandwidth of a preset sub-channel, the method further comprises:

receiving, by the first STA, a sub-channel notification frame from the first AP, wherein the sub-channel notification frame carries a preset sub-channel selected by the first AP.

11. The method according to claim 7, wherein the data load is a downlink data load; or a load sum of an uplink data load and a downlink data load.

12. The method according to claim 7, further comprising:

determining, by the first STA, that the frequency interference exists between the first STA and the second STA, based on a signal strength of any one or a combination of a management frame, a control frame and a data frame, where the management frame, the control frame and the data frame are sent by the second AP.

13. A first access point (AP), comprising:

a memory storing program instructions; and a processor configured to execute the program instructions to:

receive a frame sent by a second AP, wherein the frame carries a downlink data load of the second AP, and frequency interference exists between the first AP and the second AP; and adjust a channel bandwidth for performing data communication with a station (STA), based on a downlink data load of the first AP and the downlink data load of the second AP, to reduce a probability that the first AP and the second AP transmit data in the same channel, wherein adjusting the channel bandwidth for performing data communication with the STA comprises:

obtaining a load sum of the downlink data load of the first AP and the downlink data load of the second AP; and determining a first relationship of values between the load sum and a first preset load, determining a second relationship of values between the load sum and a second preset load, and adjusting the channel bandwidth for performing the data communication with the STA based on the first and second relationships of values, wherein the first preset load is less than the second preset load.

14. The first AP according to claim 13, wherein the processor executes the program instructions further to:

in a case that it is determined that the load sum is less than or equal to the first preset load:

determine that the channel bandwidth for performing the data communication with the STA is a maximum channel bandwidth; contend for a channel according to a carrier sense multiple access with collision avoidance (CSMA/CA) mechanism; and adjust the channel bandwidth for performing the data communication with the STA to the maximum channel bandwidth, in a case that it is determined that the load sum is less than or equal to the first preset load;

in a case that it is determined that the load sum is greater than the first preset load and is less than or equal to the second preset load:

determine that the channel bandwidth for performing the data communication with the STA is the maximum channel bandwidth; determine an access probability for accessing the maximum channel bandwidth, based on a load proportion between the downlink data load of the first AP and the downlink data load of the second AP; determine that an access value generated randomly by the first AP is less than the access probability; and adjust the channel bandwidth for performing the data communication with the STA to the maximum channel bandwidth; and in a case that it is determined that the load sum is greater than the second preset load:

adjust the channel bandwidth for performing the data communication with the STA to a bandwidth of a preset sub-channel; or determine the channel bandwidth for performing the data communication with the STA, based on the relationship of load value between the downlink data load of the first AP and the downlink data load of the second AP; and adjust the channel bandwidth for performing the data communication with the STA, to a channel bandwidth determined by the first AP based on a load comparison.

15. The first AP according to claim 14, wherein the processor executes the program instructions further to:

determine that the channel bandwidth for performing the data communication with the STA is less than the maximum channel bandwidth, in a case that it is determined that the downlink data load of the first AP is less than the downlink data load of the second AP; or determine that the channel bandwidth for performing the data communication with the STA is the maximum channel bandwidth, in a case that it is determined that the downlink data load of the first AP is greater than the downlink data load of the second AP.

16. The first AP according to claim 14, wherein the processor executes the program instructions further to:
before the channel bandwidth for performing the data communication with the STA is adjusted to a bandwidth of a preset sub-channel,
select the preset sub-channel from the channel randomly; or
determine a sub-channel selected by the second AP; and select a sub-channel other than the sub-channel in the channel, as the preset sub-channel.

17. The first AP according to claim 16, wherein the processor executes the program instructions further to:
receive a sub-channel notification frame from the second AP, wherein the sub-channel notification frame carries the sub-channel selected by the second AP;
send a sub-channel request frame to the second AP, and receive a sub-channel response frame from the second AP, wherein the sub-channel response frame carries the sub-channel selected by the second AP; or
send a measurement request frame to the STA, and receive a measurement response frame from the STA, wherein the measurement response frame carries the sub-channel selected by the second AP.

18. The first AP according to claim 13, wherein the processor executes the program instructions further to:
determine that the frequency interference exists between the first AP and the second AP, based on a signal strength of any one or a combination of a management frame, a control frame and a data frame, where the management frame, the control frame and the data frame are sent by at least one of the second AP and an STA associated with the second AP.

19. A first station (STA), comprising:
a memory storing program instructions; and
a processor configured to execute the program instructions to:
receive a first frame from a first access point (AP), wherein the first frame carries a data load of the first AP;
receive a second frame from a second AP, wherein the second frame carries a data load of the second AP; and
adjust a channel bandwidth for performing the data communication with the first AP, based on the data load of the first AP and the data load of the second AP, to reduce a probability that the first STA and a second STA transmit data in the same channel, wherein frequency interference exists between the first STA and the second STA, wherein the adjusting, by the first STA, the channel bandwidth for performing the data communication with the first AP comprises:
obtaining a load sum of the data load of the first AP and the data load of the second AP;
determining a first relationship of values between the load sum and a first preset load and a second relationship of values between the load sum and a second preset load; and
adjusting the channel bandwidth for performing the data communication with the first AP based on the first and second relationships of values, wherein the first preset load is less than the second preset load.

20. The first STA according to claim 19, wherein the processor executes the program instructions further to:
in a case that it is determined that the load sum is less than or equal to the first preset load:
determine that the channel bandwidth for performing the data communication with the first AP is a maximum channel bandwidth; contend for a channel according to a carrier sense multiple access with collision avoidance (CSMA/CA) mechanism; and adjust the channel bandwidth for performing the data communication with the first AP to the maximum channel bandwidth;
in a case that it is determined that the load sum is greater than the first preset load and is less than or equal to the second preset load:
determine that the channel bandwidth for performing the data communication with the first AP is the maximum channel bandwidth; determine an access probability for accessing the maximum channel bandwidth, based on a load proportion between the data load of the first AP and the data load of the second AP; determine that an access value generated randomly by the first STA is less than the access probability; and adjust the channel bandwidth for performing the data communication with the first AP to the maximum channel bandwidth; and
in a case that it is determined that the load sum is greater than the second preset load:
adjust the channel bandwidth for performing the data communication with the first AP to a bandwidth of a preset sub-channel; or determine the channel bandwidth for performing the data communication with the first AP, based on a relationship of load value between the data load of the first AP and the data load of the second AP; and adjust the channel bandwidth for performing the data communication with the first AP to a channel bandwidth determined by the first STA based on the relationship of the load value.

21. The first STA according to claim 20, wherein the processor executes the program instructions further to:
determine that the channel bandwidth for performing the data communication with the first AP is less than the maximum channel bandwidth, in a case that it is determined that the data load of the first AP is less than the data load of the second AP; or
determine that the channel bandwidth for performing the data communication with the first AP is the maximum channel bandwidth, in a case that it is determined that the data load of the first AP is greater than the data load of the second AP.

22. The first STA according to claim 20, wherein the processor executes the program instructions further to:
before the channel bandwidth for performing the data communication with the first AP is adjusted to the bandwidth of the preset sub-channel, receive a sub-channel notification frame from the first AP, wherein the sub-channel notification frame carries a preset sub-channel selected by the first AP.

23. The first STA according to claim 19, wherein the data load is
a downlink data load; or
a load sum of an uplink data load and a downlink data load.

24. The first STA according to claim 19, wherein the processor executes the program instructions further to:
determine that the frequency interference exists between the first STA and the second STA, based on a signal strength of any one or a combination of a management frame, a control frame and a data frame, where the management frame, the control frame and the data frame are sent by the second AP.

* * * * *